United States Patent
Flanagan et al.

(10) Patent No.: US 7,747,434 B2
(45) Date of Patent: Jun. 29, 2010

(54) INTEGRATED SPEECH RECOGNITION, CLOSED CAPTIONING, AND TRANSLATION SYSTEM AND METHOD

(75) Inventors: Mary Flanagan, Framingham, MA (US); Michael Garr, Bethesda, MD (US)

(73) Assignee: Speech Conversion Technologies, Inc., Silver Springs, MD (US)

( * ) Notice: Subject to any disclaimer, the term of this patent is extended or adjusted under 35 U.S.C. 154(b) by 912 days.

(21) Appl. No.: 11/554,411

(22) Filed: Oct. 30, 2006

(65) Prior Publication Data

US 2008/0052069 A1   Feb. 28, 2008

Related U.S. Application Data

(63) Continuation-in-part of application No. 09/695,631, filed on Oct. 24, 2000, now Pat. No. 7,130,790.

(51) Int. Cl.
  *G10L 15/26* (2006.01)
(52) U.S. Cl. .................. 704/235; 704/211; 348/468; 348/461; 348/552; 348/564; 348/588; 715/723; 709/219; 725/37; 725/139
(58) Field of Classification Search .......... 348/468, 348/461, 552, 564, 588, 563; 704/235, 211; 715/723; 709/219; 725/37, 139
See application file for complete search history.

(56) References Cited

U.S. PATENT DOCUMENTS

| 5,457,542 | A |   | 10/1995 | Kim |
| 5,543,851 | A |   | 8/1996 | Chang |
| 5,615,301 | A | * | 3/1997 | Rivers .................. 704/277 |

(Continued)

FOREIGN PATENT DOCUMENTS

JP            10234016 A      9/1998

OTHER PUBLICATIONS

Translation of JP10234016A, Dec. 24, 2004.

(Continued)

*Primary Examiner*—Vijay B Chawan

(57) ABSTRACT

A system and method that integrates automated voice recognition technology and speech-to-text technology with automated translation and closed captioning technology to provide translations of "live" or "real-time" television content is disclosed. It converts speech to text, translates the converted text to other languages, and provides captions through a single device that may be installed at the broadcast facility. The device accepts broadcast quality audio, recognizes the speaker's voice, converts the audio to text, translates the text, processes the text for multiple caption outputs, and then sends multiple text streams out to caption encoders and/or other devices in the proper format. Because it automates the process, it dramatically reduces the cost and time traditionally required to package television programs for broadcast into foreign or multi-language U.S. markets.

5 Claims, 1 Drawing Sheet

U.S. PATENT DOCUMENTS

| | | | | |
|---|---|---|---|---|
| 5,677,739 | A | * | 10/1997 | Kirkland .................... 348/468 |
| 5,701,161 | A | | 12/1997 | Williams et al. |
| 5,737,725 | A | * | 4/1998 | Case ........................ 704/260 |
| 5,900,908 | A | | 5/1999 | Kirkland |
| 5,943,648 | A | | 8/1999 | Tel |
| 6,320,621 | B1 | | 11/2001 | Fu |
| 6,338,033 | B1 | | 1/2002 | Bourbonnais et al. |
| 6,393,389 | B1 | | 5/2002 | Chanod et al. |
| 6,412,011 | B1 | | 6/2002 | Agraharam et al. |
| 6,430,357 | B1 | * | 8/2002 | Orr ........................... 386/69 |
| 6,658,627 | B1 | | 12/2003 | Gallup et al. |
| 2001/0025241 | A1 | | 9/2001 | Lange et al. |
| 2001/0037510 | A1 | | 11/2001 | Lee |
| 2001/0044726 | A1 | | 11/2001 | Li et al. |

OTHER PUBLICATIONS

Nyberg et al. "A Real-Time MT System for Translating Broadcast Captions," 1997 in Proceeding of MT Summit VI.

Toole et al, "Time-constrained Machine Translation" In Proceedings of the Third Conference of the Association for Machine Translation in the Americas (AMTA-98), 1998, pp. 103-112.

Turcato et al. "Pre-Processing Closed Captions for Machine Translation," Proceedings of the ANLP/NAACL Workshop on Embedded Machine translation Systems, pp. 38-45, May 2000.

* cited by examiner

INTEGRATED SPEECH RECOGNITION, CLOSED CAPTIONING, AND TRANSLATION SYSTEM AND METHOD

CROSS-REFERENCE TO RELATED APPLICATION

This application is a continuation-in-part of U.S. patent application Ser. No. 09/695,631 filed Oct. 24, 2000, now U.S. Pat. No. 7,130,790 issued Oct. 31, 2006, which is incorporated herein by reference.

FIELD OF THE INVENTION

The present invention relates generally to systems and methods for providing closed caption data programming. In particular, the present invention relates to a system and method for integrating automated voice recognition technology with closed captioning technology and automated translation to produce closed captioned data for speech in live broadcasts.

BACKGROUND OF THE INVENTION

As directed by Congress in the Telecommunications Act of 1996, the FCC adopted rules requiring closed captioning of all television programming by 2010. The rules became effective Jan. 1, 1998. Closed captioning is designed to provide access to television for persons who are deaf and hard of hearing. It is similar to subtitles in that it displays the audio portion of a television signal as printed words on the television screen. Unlike subtitles, however, closed captioning is hidden as encoded data transmitted within the television signal, and provides information about background noise and sound effects. A viewer wishing to see closed captions must use a set-top decoder or a television with built-in decoder circuitry. Since July 1993, all television sets sold in the U.S. with screens thirteen inches or larger have had built-in decoder circuitry.

The rules require companies that distribute television programs directly to home viewers ("video program distributors") to provide closed captioned programs. Video program distributors include local broadcast television stations, satellite television services, local cable television operators, and other companies that distribute video programming directly to the home. In some situations, video program distributors are responsible for captioning programs.

Beginning Jan. 1, 2000, the four major national broadcast networks (ABC, NBC, CBS, and Fox) and television stations in the top 25 television markets (as defined by Nielsen) that are affiliated with the major networks are not permitted to count electronic newsroom captioned programming towards compliance with their captioning requirements. Electronic newsroom captioning technology creates captions from a news script computer or teleprompter and is commonly used for live newscasts. Only material that is scripted can be captioned using this technology. Therefore, live field reports, breaking news, and sports and weather updates are typically not captioned. Impromptu, unscripted interaction among newsroom staff is also not captioned. Because of these limitations, the FCC decided to restrict the use of electronic newsroom captioning as a substitute for real-time captioning. This rule also applies to national non-broadcast networks (such as CNN®, HBO®, and other networks transmitting programs over cable or through satellite services) serving at least 50% of the total number of households subscribing to video programming services.

These requirements and restrictions force local and national programmers to provide "live" or "real-time" closed captioning services. Typically, real-time captions are performed by stenocaptioners, who are court reporters with special training. They use a special keyboard (called a "steno keyboard" or "shorthand machine") to transcribe what they hear as they hear it. Unlike a traditional "QWERTY" keyboard, a steno keyboard allows more than one key to be pressed at a time. The basic concept behind machine shorthand is phonetic, where combinations of keys represent sounds, but the actual theory used is much more complex than straight phonics. Stenocaptioners need to be able to write real time at speeds well in excess of 225 words per minute, with a total error rate (TER) of under 1.5%. The steno then goes into a computer system where it is translated into text and commands. Captioning software on the computer formats the steno stream of text into captions and sends it to a caption encoder. The text stream may be sent directly to the computer or over the telephone using a modem.

There is no governing body for stenocaptioners. Many have credentials assigned by the state board overseeing court reporters, the National Court Reporters Association (NCRA) for machine shorthand writers, or the National Verbatim Reporters Association (NVRA) for mask reporters using speech recognition systems. Rates for stenocaptioners services range from tens of dollars per hour to hundreds of dollars per hour. The cost to networks or television stations to provide "live" or "real-time" closed captioning services therefore, vary greatly but are expensive because the process is labor intensive.

There are real-time speech recognition systems available for "mask reporters," people who repeat everything they hear into a microphone embedded in a face mask, and inserting speaker identification and punctuation. However, these mask reporting systems are also labor intensive and are unlikely to significantly reduce the cost of providing "live" or "real-time" closed captioning services.

The FCC mandated captioning requirements and the rules restricting the use of electronic newsroom captioning as a substitute for real-time captioning for national non-broadcast and broadcast networks and major market television stations creates a major expense for each of these entities. Because they are required to rely on specially trained stenocaptioners or mask reporters as well as special software and computers, program creators may be required to spend tens to hundreds of thousands of dollars per year. Therefore, there is a need for a system and method that provides "live" or "real-time" closed caption data services at a much lower cost.

SUMMARY OF THE INVENTION

The present invention integrates automated voice recognition technology and speech-to-text technology with closed captioning technology and automated translation to provide translations of "live" or "real-time" television content. This combination of technologies provides a viable and cost effective alternative to costly stenocaptioners or mask reporters for news and other "live" broadcasts where scripts are of minimal value. As a result, networks and televisions stations are able to meet their requirements for "live" or "real-time" closed captioning services at a much lower cost.

The present invention converts speech to text, translates the converted text to other languages, and provides captions through a single device that may be installed at the broadcast facility. The device accepts broadcast quality audio, identifies the speaker's voice, converts the audio to text, translates the text, processes the text for multiple caption outputs, and then sends multiple text streams out to caption encoders and/or other devices in the proper format. The system supports multiple speakers so that conversations between individuals may be captioned. The system further supports speakers that are "unknown" with a unknown voice trained module. Because it automates the process, it dramatically reduces the cost and time traditionally required to package television programs for broadcast into foreign or multi-language U.S. markets.

DESCRIPTION OF EXAMPLE EMBODIMENTS

Figure 1:
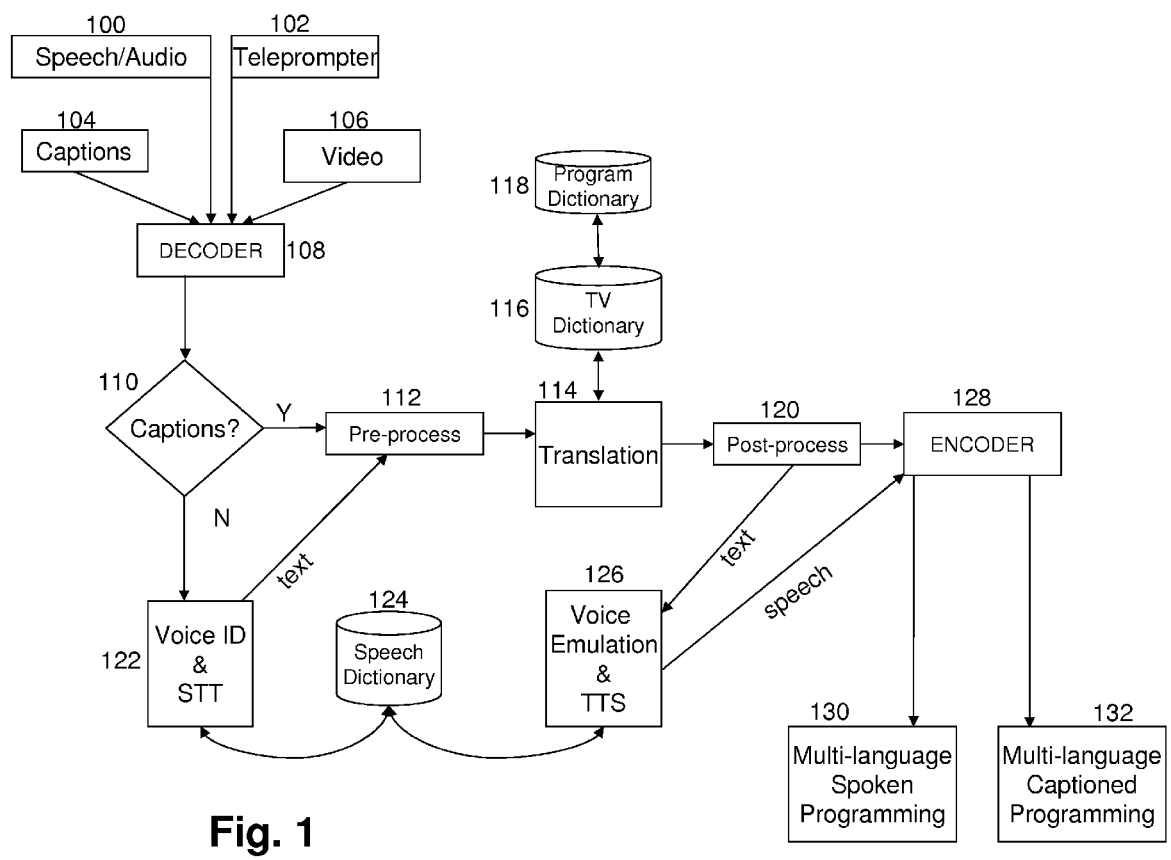
FIG. 1 is a block diagram of the primary components for an example embodiment of the present invention.

Referring to FIG. 1, a block diagram of the primary components for an example embodiment of the present invention is shown. The present invention comprises a closed caption decoder module 108 and encoder 128 with features and functionality to provide speech-to-text conversion and language translation. In an example embodiment of the present invention, there are four possible inputs to the decoder module 108. The decoder module 108 comprises a decoder for each input stream. The first input is speech/audio 100 which includes audio track from a television program or other video source such as videotape recording and may contain speech from one or more speakers. The second input is a teleprompter 102 which is the text display system in a newsroom or live broadcast facility. The text may be directed to the captioning system as a replacement for live captioning. The third input is captions 104 which may be live or pre-recorded text captions that are produced live or prior to program airing. Captions contain the text of the original language and captioning control codes. The fourth input is video 106 which is the video portion of a television program. In an example embodiment of the present invention, the decoder module 108 accepts a NTSC video source and/or digital video source with caption information in EIA 508 and EIA 608 formats or caption text via a modem or serial connection.

The decoder module 108 extracts text captions encoded on Line 21 of the VBI and outputs them as a serial text stream. The decoder module 108 also extracts and sends video to the encoder 128. Finally, it may extract audio and send it to the encoder 128, the voice identifier and speech-to-text module 122, or both. The encoder 128 inserts text captions from a formatted text stream onto Line 21 of the VBI.

The translation components of the present invention comprise a pre-process module 112, a translation module 114, a post-process module 120, a TV dictionary 116, and a program dictionary 118. The pre-process module 112 extracts closed captioning control codes, corrects common spelling errors, and maps common usage errors and colloquialisms to correct forms. The translation module 114 may be a commercially available machine translation module such as Machine Translation (MT) technology from IBM® or a proprietary machine translation system. The TV dictionary 116 is an electronic dictionary of television terminology and its grammatical characteristics and multilingual translations. The TV dictionary 116 is stored in a format readable by the machine translation module 114. The program dictionary 118 is an electronic dictionary of terminology specific to a particular television program or genre as well as grammatical characteristics of the terminology and multilingual translations. The dictionary is stored in a format readable by the machine translation module 114. The post-process module 120 provides monolingual automatic editing of the output language based on previous examples. In an example embodiment of the present invention, multiple languages are supported. The translation software, dictionaries, and rules engine for each language are stored and accessible via modem or serial port so that they may be updated and modified as needed from a remote location.

Decoder module 108 program logic performs caption testing to determine whether an incoming sentence is captioned 110. If it is captioned, the captions are sent to the pre-process module 112, the translation module 114, and the post-process module 130. If the incoming sentence is uncaptioned, the audio is sent to the voice identification and speech-to-text module 122 for conversion to text. The voice identification and speech-to-text module 122 identifies multiple, simultaneous voices using data from a speech dictionary 124 that contains voice identification data for a plurality of pre-trained speakers (e.g., 25-30 speakers). Once the speaker has been identified, it loads the appropriate speech-trained model to complete the speech-to-text conversion. The voice identification and speech-to-text module 122 transcribes voice data into independent text streams making reference to the data from the speech dictionary 124. It tags each independent text stream with a unique identifier for each speaker. If the speaker is not identified, it is processed with an "unknown voice" trained module. As a result, speech-to-text conversion may be performed even if the speaker has not been or cannot be identified.

The voice emulation and text-to-speech module 126 receives a text stream as input (from the voice identification and speech-to-text module 122) with encodings that indicate a specific speaker. The module 126 converts the text stream to spoken language. When converting the text stream, it references the speech dictionary 124 to identify and map pitch characteristics to the generated voice (voice morphing). The speech is then sent to the encoder 128 for output in the television broadcast.

The encoder 128 outputs multi-language spoken programming in which the program is distributed with generated foreign-language speech accessible through a secondary channel (SAP) or in the main channel as well as multi-language captioned programming in which the program is distributed with encoded multilingual captions that are viewable by an end user.

In an example embodiment of the present invention, all generated text for each ½ hour period is recorded as a unique record and stored in a file. The system maintains a log of all records that are accessible via modem or serial port. The log file may be updated daily with files. Files over 30 days old may be deleted.

The components of the present invention may be configured to be standalone and rack mountable with a height of 2-3 rack units. The hardware may be a Pentium 4 processor (or equivalent) 125 MB of SDRAM, 20 GB hard drive, 56 KB modem, 3-4 serial ports, caption data decoding circuitry and audio-to-digital converter, power supply, video display card and decoder output. The display component may be a LCD display that can be configured as a PC monitor and as a video monitor.

The present invention has been described in relation to an example embodiment. Various modifications and combinations can be made to the disclosed embodiments without departing from the spirit and scope of the invention. All such modifications, combinations, and equivalents are intended to be covered and claimed.

What is claimed is:

1. A method for processing a speech portion of audio signals from multiple speakers in a broadcast program signal comprising the steps of:
   (a) receiving said audio signal from said broadcast program signal comprising at least a speech portion, wherein said speech portion of said audio signal is not previously processed by a human operator for syntax or context;
   (b) processing said speech portion of said audio signal for a speaker without any input from a human operator;
   (c) converting said speech portion of said audio signal for said speaker to text without any input from a human operator;
   (d) transmitting said text to a first closed caption channel;
   (e) translating said text in real time to produce translated text for said speaker;
   (f) transmitting said translated text to a second closed caption channel; and
   (g) converting said translated text to an audio signal comprising speech generated for said speaker according to said translated text.

2. The method of claim 1 wherein translating said text to produce translated text comprises pre-processing said text to:
   (a) extract closed captioning control codes;
   (b) corrects spelling errors; and
   (c) map usage errors and colloquialisms to correct forms.

3. The method of claim 1 wherein translating said text to produce translated text comprises post-processing said translated text to perform monolingual automatic editing of said translated text based on previous examples.

4. The method of claim 1 wherein receiving said audio signal from said broadcast program signal comprises receiving said audio signal from a live broadcast program signal.

5. The method of claim 1 wherein receiving said audio signal from said broadcast program signal comprises receiving said audio signal from a recorded broadcast program signal.

* * * * *